Feb. 26, 1952 J. P. SMITH 2,587,005

SIGNAL CONVERSION SYSTEM

Filed Oct. 29, 1947 4 Sheets-Sheet 1

INVENTOR
John Paul Smith
BY Olin F. Mitchell
ATTORNEY

INVENTOR
John Paul Smith
BY [signature]
ATTORNEY

INVENTOR
John Paul Smith
BY Olin A. Mitchell
ATTORNEY

INVENTOR
John Paul Smith
BY
ATTORNEY

Patented Feb. 26, 1952

2,587,005

UNITED STATES PATENT OFFICE 2,587,005

SIGNAL CONVERSION SYSTEM

John Paul Smith, Cranbury, N. J., assignor to Radio Corporation of America, a corporation of Delaware Application October 29, 1947, Serial No. 782,803

7 Claims. (Cl. 178—5.2)

Figure 1:
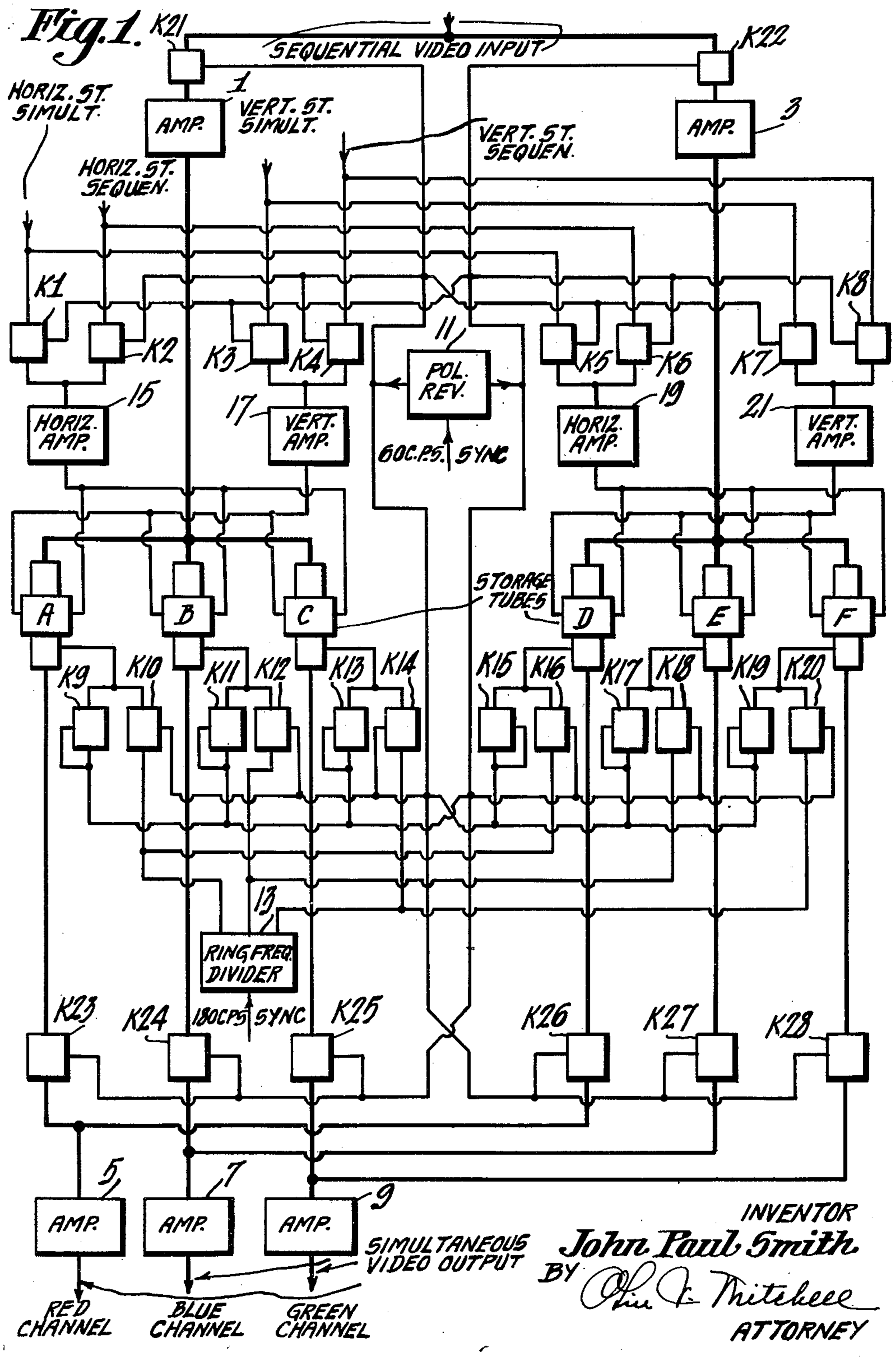

This invention relates to the conversion of one signal type to another signal type and particularly to the conversion of sequential type color television signals into simultaneous type color television signals.

Many important types of electric signaling are concerned not only with the transmission of intelligence, but are concerned with the sequence and order of its transmission. For such types of electrical signaling, sync impulses or other synchronizing information usually accompany the transmission of the intelligence.

Along with the development of these various types of signaling has come the requirement for conversion from one particular type to another particular type involving a different order of transmission or a different standard.

An important example is suggested by the transmission of color television signals.

It is quite well known that the transmission of images by electricity can be accomplished by analyzing the image into its image elements and forming a signal train of impulses by a predetermined orderly sequence of scanning. The image may then be reproduced at a remote location by the same sequence of scanning.

It is also well known to the optical art that the reproduction of images in color may be accomplished by additive methods, that is, breaking down the light from an object into a predetermined number of selected primary or component colors which are three in number for a tricolor system or, for a compromised degree of fidelity of color representation, even a bicolor system may be employed.

Color images may therefore be transmitted by electricity by analyzing the light from the object into not only its image elements, but by also analyzing the light from elemental areas of the object into selected primary or component colors and forming a signal train of impulses representative of each of the selected component colors. A color image may then be reproduced at a remote point by appropriate reconstruction from the component color signal trains.

The transmission and reproduction of color images may be accomplished by either of two fundamental systems of multiple image transmission which have become widely known as the sequential and the simultaneous systems of color image transmission.

The sequential system transmits at any one time only one component color signal train and transmits a portion of each of the selected component color signal trains in predetermined sequence with other selected component color signal trains and preferably at a rapidly recurring rate.

The simultaneous system transmits all component color signal trains simultaneously through a plurality of signal channels.

In the transmission of images by the sequential system, the camera may have a single image pickup tube such as, for example, the so-called image orthicon, which is exposed in succession to images giving color separation corresponding to the various selected component colors. During the period that the camera tube is exposed to each color component image, the target electrode is concurrently scanned to enable the transmission of signals representing the corresponding color separation image.

In the conventional sequential multicolor television receiver, a kinescope or other image reproducing tube is employed to recreate a black and white image likeness which is viewed or projected through a color filter of the selected component color corresponding to the desired component color instantaneously being represented. The process is then repeated for the next selected color component, and so on.

A typical sequential color television system is shown and described in an article entitled "An Experimental Color Television System," beginning on page 141 of the "RCA Review" for June 1946.

A simultaneous all-electronic color television system has been proposed involving a cathode ray scanning tube which forms a scanning raster to be projected on a color film from which selected color component light sensitive devices transform the resultant light into several separate signal trains, each representative of a selected component color. A system of this nature is sometimes referred to as the flying spot system, and is shown and described in an article entitled "Simultaneous All-Electronic Color Television," beginning on page 459 of "RCA Review" for December 1946.

Other systems of simultaneous electronic color television have been proposed involving the simultaneous employment of several image pickup devices and several corresponding image producing devices which are adapted to combine the several component color images to form a composite image in substantially its natural color.

According to one form of this invention, signals which are "picked up" by the sequential method (as, for example, the method referred to) may be converted into signals which are suitable for reproduction in devices adapted for the simultaneous type of color television image signals.

According to this invention, predetermined portions of a signal train are stored and retransmitted in accordance with a predetermined arrangement.

In my copending U. S. application, Serial No. 788,511, filed November 28, 1947, circuit arrangements are shown for converting simultaneous type television signals and the like into sequential type television signals and the like.

A primary object of this invention is to provide for the conversion of intelligence signals of one type into intelligence signals of another type.

Another object of this invention is to accurately convert television signals of the sequential type into television signals of the simultaneous type.

Figure 2:
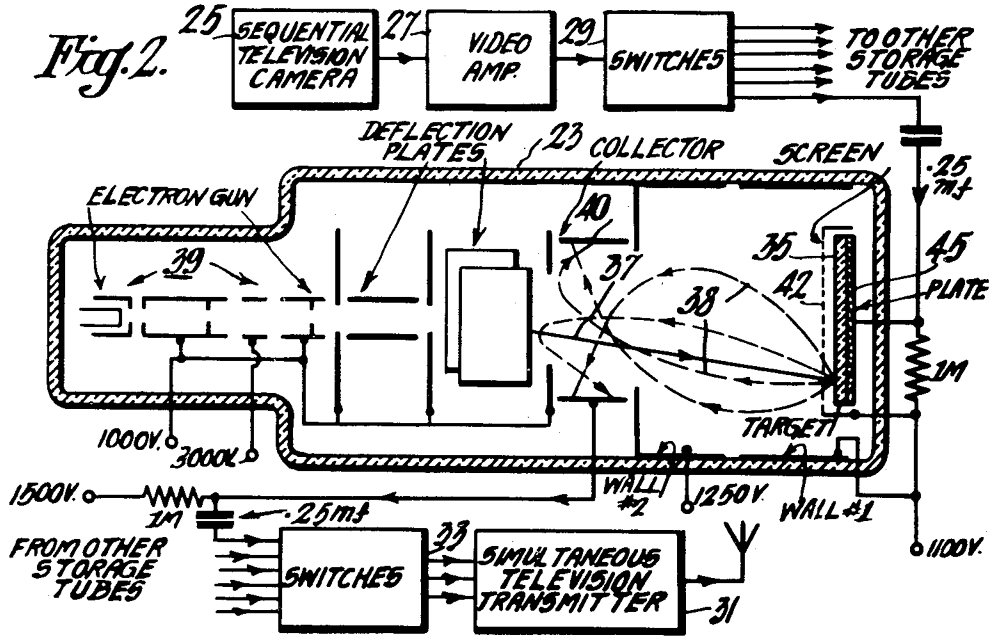

Other and incidental objects of the invention will be apparent to those skilled in the art from a reading of the following specification and an inspection of the accompanying drawing in which Figure 1 illustrates by block diagram one form of this invention adapted to convert sequential television signals into simultaneous television signals;

Figure 2 shows a detailed illustration of a storage tube suitable for employment in the practice of this invention; and Figures 3, 4, 5, 6 and 7 show by circuit diagram details of the components shown in block in Figures 1 and 2.

Figures 5, 6:
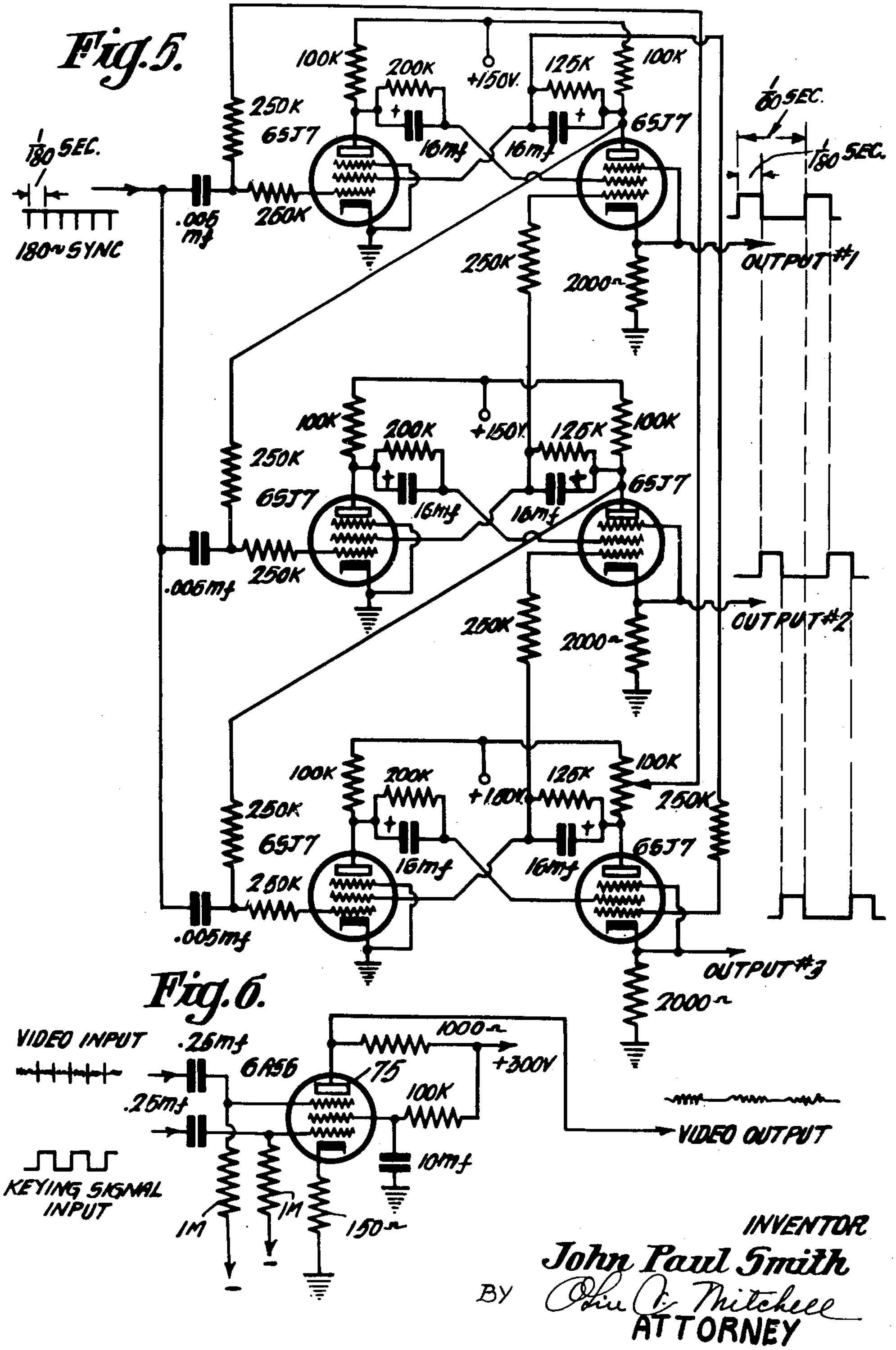

Turning now in more detail to Figure 1, a sequential video signal is applied to switching device K21 which may, for example, take the form of an electronic switch shown in more detail in Figure 6. Other switching devices may be substituted in switch K21 providing, of course, they operate sufficiently rapidly and accurately. The sequential video signal is then applied to three storage tubes A, B and C through an amplifier 1.

The sequential video signal is also applied to switch K22 during the subsequent time interval. Amplifier 3 is connected to switch K22 to receive the sequential video signal therefrom and transmit it to storage tubes D, E and F.

The output signals from storage tubes A, B, C, D, E and F are transmitted through the switching devices K23 to K28, inclusive, to amplifiers 5, 7 and 9, each of which is contained in a separate component color channel of a simultaneous type video signal circuit.

The path of the video signal through the system is indicated in Figure 1 of the drawing by heavy lines.

A polarity reverser 11 located in the center of the diagram is driven by a synchronizing pulse to form a square wave. The potential furnished in the lead to the left of the polarity reverser is 180° out of phase with the potential furnished in the lead to the right of the polarity reverser 11. Polarity reverser 11 may, for example, take the form of a multivibrator circuit arrangement shown in detail in Figure 3.

Circuit elements are adjusted so that switch K21 transmits video signals during one-half of the square wave cycle generated by the polarity reverser 11, while switch K22 transmits video signals only during the other half of the square wave cycle generated by the polarity reverser 11. It will be seen, therefore, that a video signal will be furnished storage tubes A, B and C during one interval of time, and the video signal will be furnished storage tubes D, E and F during the following interval of time.

The timing of the switching from one group of storage tubes to the other is determined by the synchronizing signal recurring rate. According to one form of the invention, the synchronizing signal is the same as that employed in the overall television system which normally is based on the commercial power supply frequency of 60 cycles per second.

Polarity reverser 11 also furnishes switches K23, K24 and K25 with a control potential which operates to make switches K23, K24 and K25 conductive to transmit video signals during the time interval in which switch K22 at the upper right-hand corner of the drawing is conductive to pass a video signal.

Likewise, switches K26, K27 and K28 are actuated by the control potential furnished by polarity reverser 11 to make them transmit video signals during the same interval of time that switch K21 in the upper left-hand corner of the drawing is passing video signals.

It will therefore be seen that during the interval of time in which storage tubes A, B and C are receiving their charge, storage tubes D, E and F are connected to give up their charge simultaneously through amplifiers 5, 7 and 9. Likewise, when storage tubes D, E and F are receiving their charge through amplifier 3, storage tubes A, B and C are connected to transmit their charge through amplifiers 5, 7 and 9, respectively.

In order, however, for the proper distribution of separate portions of the incoming signal train in accordance with its designated component color, it is necessary to sequentially switch the storage tubes to receive a signal of a designated component color. This is accomplished through switches K9 to K20, inclusive, which are actuated by the control voltage derived from polarity reverser 11. Switches K9 to K20, inclusive, are connected to the control electrode of the storage tube A through, and including, storage tube F. It will be seen that switches K10, K12, K14, K16, K18 and K20 also receive a control potential from ring frequency divider 13, which may also be driven by the system synchronizing signal. In the form of the invention shown, the sync signal applied to the ring frequency divider 13 is that of the sequential system of 180 cycles per second or three times the switching frequency of 60 cycles per second. It is not intended, however, that the practice of the invention should be limited thereto. The ring frequency divider 13 may, for example, take the form of the circuit arrangement shown in detail in Figure 5. The ring frequency divider 13 is arranged to apply a potential to the control electrodes of the storage tubes of such a potential and magnitude as to cause them to be operative sequentially in groups. The timing is arranged so that during the interval occupied by the sequential video signal representative of, for example, one selected component color, storage tube A is actuated. Likewise, during the occurrence of a sequential video signal representative of another component color, storage tube B is actuated. During the occurrence of video signals representing a third sequential color, storage tube C is operative. This permits the designation of one of storage tubes A, B and C to be operative at a time during the charging action. The same is true with storage tubes D, E and F.

During the discharge time interval of the storage tubes, switches K9, K11, K13, K15, K17 and K19 are activated by the control voltage derived from polarity reverser 11 to apply to the control electrodes of each of the storage tubes potential changes adjusted for proper "picking up" of the signal layed down in the previous scanning action.

In converting sequential video signals to simultaneous video signals, it is also necessary that a different rate of scanning be employed in the laying down of the signal and also the picking up of the signal. This is accomplished by the employment of two sets of scanning standards for the scanning elements of the storage tubes.

At the top of the drawing, there is illustrated input circuits for horizontal and vertical sawtooth wave deflection voltage both at the simultaneous rate and sequential rate. Through switches K1 to K8 inclusive, appropriate scanning energy is supplied to horizontal amplifier 15, vertical amplifier 17, horizontal amplifier 19, and vertical amplifier 21.

The generation and application of deflection currents to the storage tubes is well known in the art and may take any of a number of well known forms. For purpose of illustration, however, there is shown in detail in Figure 7 of the drawing a suitable deflection circuit arrangement.

It will be noticed that horizontal amplifier 15 and vertical amplifier 17 are connected to the sources of sequential deflection voltage at the same time switch K21 permits the transmission of sequential video signals to the storage tubes A, B and C, likewise horizontal amplifier 19 and vertical amplifier 21 are connected to the source of sequential deflection voltage at the time switch K22 permits the transmission of sequential video signals to storage tubes D, E and F.

During the time, however, that the signal is picked up from storage tubes A, B and C, the simultaneous deflection signal voltages are applied to horizontal amplifier 15 and vertical amplifier 17.

Turning now in more detail to Figure 2, there is illustrated one suitable type of storage tube 23 which is commercially known as the STE type. There are other types of storage tubes which are suitable. One other type, known commercially as the SDT-5 is shown and described in detail in a copending application of Richard L. Snyder, Jr., entitled "Electron Tubes," Serial No. 606,812, and filed July 24, 1945, now Patent No. 2,548,405, granted April 10, 1951.

A sequential type television camera 25 transmits its sequential video signal through video amplifier 27 to a series of switches 29, illustrated in block for convenience in Figure 2. The detailed circuit arrangement connecting switches 29 of Figure 2 to their associated storage tubes may be similar to that shown in Figure 1, however, for the purpose of simplification of explanation of Figure 2, a single storage tube 23 is employed.

Likewise, the connections to the simultaneous television transmitter 31 are obtained through a group of switches 33 in a manner described under Figure 1 above.

Although the detailed operation of storage tube 23 is known to the art, it may be well to briefly review its operation in order to insure complete undertsanding of the operation of applicant's invention. The storage tube type STE records electrical signals from the switching device 29 in the form of charges distributed over a dielectric surface 35 and reproduces the record by removing the charges with an electron beam 37 generated in an electron gun 39 directed at the dielectric surface 35. Charges of either polarity may be stored; negative charges are caused by the deposition of primary beam electrons, and positive charges are caused by the extraction of secondary electrons 38 resulting from the impact of the electrons of the beam 37. Reproduction of the stored signals is accomplished by the same mechanism as that used in recording, but is carried out with no signal input. The beam 37 from the electron gun operates at constant current, except when it is blanked during blanking or standby period. The number of secondary electrons 38 generated by the beam on striking the dielectric surface 35 fluctuates in a manner dependent upon the deposited charge. This secondary current, which is of low intensity, represents the output signals of the device and is available from collector electrode 40.

The dielectric surface 35, which forms the target electrode for the electron beam 37, is one side of a thin insulated layer, which is mounted with its other side in intimate contact with a conducting plate 45. Over the exposed surface 35 is stretched a fine metal screen 47, which has a high void-to-land ratio.

In operation, the electron beam 37 strikes the dielectric surface 35 with sufficient velocity to produce a secondary emission ratio greater than unity. To obtain this condition, the cathode of the electron gun 39 is maintained at ground potential, and a potential of about 1100 volts is applied to the target screen 47. With this arrangement, wherever the beam 37 strikes the dielectric 35, the potential of an elemental area of the surface under bombardment becomes the same or nearly the same as that of the screen 47, that is, equilibrium conditions exist only at this potential.

If an elemental area of the dielectric surface 35 is negative relative to the screen 47, a positive field is presented to the surface 35, and therefore all of the secondary electrons released by the impact of the beam electrons of beam 37 are drawn away. Since the number of secondary electrons is greater than the number of primary electrons, there is a net loss of negative charge, and the surface 35 changes in a positive direction. If, however, an elemental area of surface is positive with respect to the screen 47 at the time of bombardment, a negative field is presented to the surface and secondary emission is suppressed. Since no secondary electrons leave the elemental area of the dielectric surface 35, there is a net gain of negative charge and the potential of the surface 35 changes in a negative direction.

At the potential of the screen 47 or a little positive thereto, the two effects balance. Just enough of the secondaries leave the surface to neutralize the arriving primaries. This condition of unity secondary emission equilibrium probably exists at a potential a few volts positive with respect to the screen 47 because the initial velocity of most of the secondary electrons is sufficient to lift them over a 2 to 4 volt barrier. The exact potential is not very definite because it is affected by space charge conditions and the geometry of the screen 47 and nearby electrodes. The value of the equilibrium potential has substantially no influence on the operation of the tube as long as it remains substantially constant.

In the normal operation of storage tube 23, the screen 47 is maintained at a D.-C. potential of 1100 volts, and the conductor 45 on the back of the dielectric is connected to the source of signal to be recorded, which in this form of the invention is obtained from switches 29. The recording surface 35 is therefore capacity coupled to the signal plate, and also has capacity to the screen 47. When the signal voltage is impressed upon the signal plate 45, it also appears somewhat diminished in amplitude on the recording surface 35.

If, then, the beam 37 is deflected across the surface 35 while a signal is impressed on the signal plate 45, it will cause each element it strikes on surface 35 to come to the potential of screen 47 regardless of the potential the surface would otherwise have due to the influence of the signal plate. This action then establishes a charge between the signal plate 45 and the surface element on the surface 35, which will cause the element to have a potential different from that of the screen 47 when the beam moves elsewhere and the signal plate 45 returns to zero potential. If the beam scans a long path over the target 35 while a fluctuating voltage is impressed on the signal plate 45, a band of charges as wide as the beam 37 will remain on the path when the beam is cut off or traverses elsewhere on the target 35.

If the signal plate 45 returns to zero potential, the potential along the scanning path on target 35 will vary in proportion to the signal voltage impressed during the beam transit. It will, of course, be smaller than the impressed voltage and its polarity will be reversed. During the next scansion by the electron beam 37, which may, for example, be the pickup scansion, a stream of secondary electrons is released from target 35. Some of the secondaries are released from the solid parts of the screen 47 which intercepts some of the beam current. The rest come from the surface of the dielectric 35. Although the secondary emission ratio of the screen 47 is constant, the secondary emission from the dielectric surface fluctuates according to the previously assumed charge of the scanned elemental area. If a negative charge is to be supplied, secondary emission ceases until the demand has been satisfied. If a positive charge is needed, the secondary emission is at maximum until the full charge is achieved.

The fluctuations of the secondary electrons during the picking up scanning period, therefore, constitute a signal equivalent to the signal deposited in the previous scanning operation. It is therefore possible to delay a portion of the signal train in the storage tube 23 in order that it may be transmitted through simultaneous television transmitter 31 in accordance wih another desired standard.

Figures 3, 4:
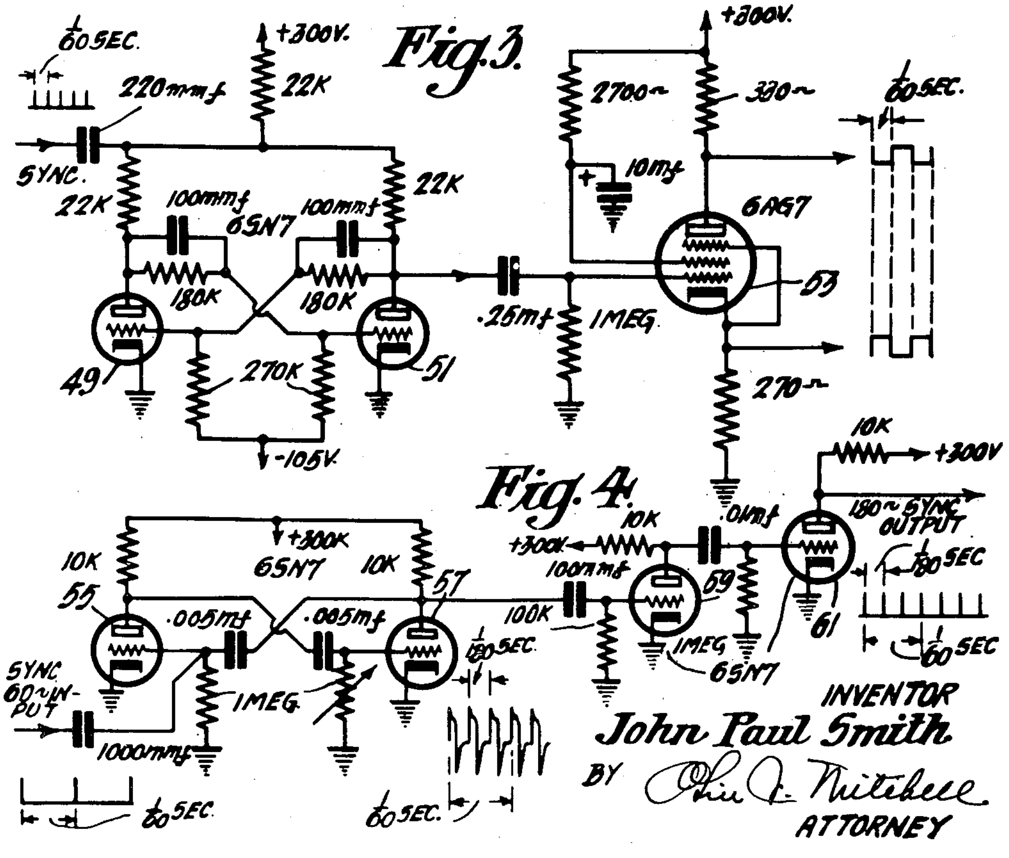

Figure 3 illustrates by circuit diagram the combination of a multi-vibrator involving tubes 49 and 51 which produces, as is well known to the art, a square wave to excite the control electrode of tube 53. Tube 53 has two output circuits, one connected to its anode and another connected to its cathode. The square wave output of each output circuit of tube 53 is therefore out of phase with each other by 180°. The output circuit of tube 53 connected to its anode may, for example, be the left-hand output circuit of the polarity reverser 11 of Figure 1, while the lower output circuit connected to the cathode of tube 53 may be the right-hand output of polarity reverser 11 of Figure 1.

Figure 4 shows in circuit diagram detail a suitable frequency multiplier which may be employed in the practice of this invention to convert 60 cycle synchronizing pulses into 180 cycle synchronizing pulses. By the use of this circuit in connection with the block diagram of Figure 1, it is possible to have a flexible system adaptable for use with 60 cycle synchronizing pulses.

Tubes 55 and 57 are employed as a multivibrator in the well known manner to produce a triple frequency pulse of the 60 cycle input synchronizing signal. The operator of the multivibrator including tubes 55 and 57 depends for its output frequency on the circuit constants which are indicated on the drawing. The circuit constants are so chosen that the multivibrator completes three cycles of operation for each triggering or synchronizing input pulse.

The 180 cycle pulse is then properly shaped and amplified in tubes 59 and 61.

The circuit arrangement shown in Figure 4 is also by way of example. Alternate methods of frequency multiplication are, of course, satisfactory for employment in the practice of this invention.

Figure 5 shows in detail one form of ring frequency divider which may be utilized in the block 13 in the lower left-hand corner of Figure 1. An input signal is applied to the circuit of Figure 5 in the upper left-hand corner, as indicated.

The operation of ring frequency divider, as illustrated in Figure 5, is also well known in the art and needs no further description here, except to call attention to the fact that the output signal of the ring frequency divider, as indicated on the right-hand side of Figure 4, provides three recurring sets of pulses, each 1/180 second in duration and spaced 1/60 second. It will be seen, therefore, that the pulses obtained from the ring frequency divider 13 of Figure 1 actuate switches K9 through K20 and make operative the proper storage tubes in proper sequence.

Figure 6 shows in circuit diagram one satisfactory type of keyer which may be employed in any of the key positions of Figure 1. The video signal is applied to one control electrode of tube 75, while the keying signal obtained from the keyer shown in Figure 3 is applied to another control electrode. The video signal obtained from the anode of tube 75 is therefore passed only during the desired intervals. The circuit of Figure 6 is the coincidence type of keyer in which both control grids have to be made positive at the same time before an output signal appears in the plate circuit.

Figure 7:
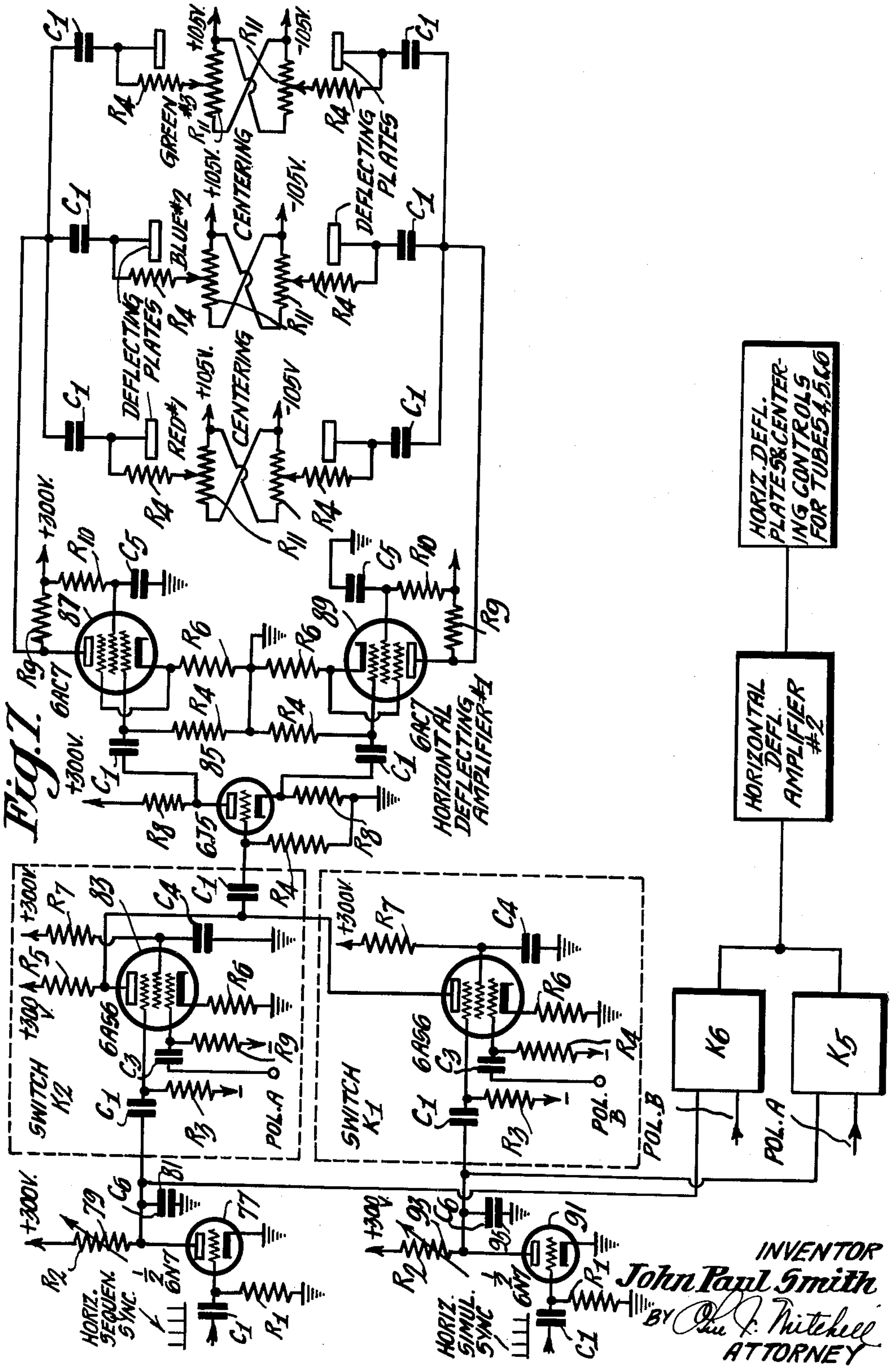

Figure 7 shows by circuit diagram a suitable deflection signal generator and amplifier which may be employed in the practice of this invention. The circuit shown in Figure 7 may, for example, be substituted for the block of Figure 1 designated as a horizontal deflection amplifier and associated switching blocks.

The sequential synchronizing pulse is applied to tube 77 which acts to form a sawtooth wave in resistance condenser combination 79 and 81.

Tube 83 acts as a switch to feed the sawtooth waves to the inverter 85, which produces a push-pull sawtooth wave through amplifier tubes 87 and 89. The sawtooth waves are then applied to the deflection plates of the storage tubes, as designated.

The synchronizing sawtooth wave formed by tube 77 is also transmitted to switch K6 at the bottom of the drawing to be applied to other amplifiers and deflection plates, as shown and described in connection with the description of Figure 1.

The simultaneous synchronizing pulse is applied to tube 91, which likewise forms a sawtooth wave in connection with resistor 93 and condenser 95. The sawtooth wave is applied to inverter tube 85 in proper timing through switch K1.

The same circuit arrangement may be employed if desired for both vertical and horizontal deflection. In view of the different rate of sawtooth wave generation, however, it is necessary that appropriate circuit constants be selected. For the purpose of example and to permit a further understanding of this invention, suitable circuit constants are listed below in chart form for both horizontal and vertical deflection circuit arrangements.

| Capacitor | Horizontal Deflection System | Vertical Deflection System |
|---|---|---|
| $C_1$ | .01 mfd | .25 mfd. |
| $C_2$ | 330 mmfd | .015 mfd. |
| $C_3$ | .25 mfd | .25 mfd. |
| $C_4$ | 1 mfd | 10 mfd. |
| $C_5$ | 1 mfd | 1 mfd. |
| $C_6$ | .001 mfd | .05 mfd. |
| Resistance: | | |
| $R_1$ | 100K ohms | 1M ohms. |
| $R_2$ | 50K ohms variable | 1M ohms variable. |
| $R_3$ | 1M ohms | 10M ohms. |
| $R_4$ | 1M ohms | 1M ohms. |
| $R_5$ | 1000 ohms | 1000 ohms. |
| $R_6$ | 150 ohms | 150 ohms. |
| $R_7$ | 100K ohms | 100K ohms. |
| $R_8$ | 2200 ohms | 2200 ohms. |
| $R_9$ | 10K ohms | 10K ohms. |
| $R_{10}$ | 68K ohms | 68K ohms. |
| $R_{11}$ | 250K ohms | 250K ohms. |

Values of capacitors, resistors and voltages, together with tube types, have been given in connection with the drawings in Figures 3, 4, 5 and 6 for the purposes of example only. Any suitable values of capacity, resistance, inductance and voltages, as well as tube types, may be substituted therefor without departing from the spirit of this invention.

Although the form of the invention shown in the drawing and described above is one in which the "laying down" cycle is equal to the sum of the "picking up" or "reading" cycle, it is pointed out that if $n$ represents the time of the "laying down" or "writing" cycle, the "picking up" cycle may be $n$ or $2n$, as well as $3n$, and still have the switching occur during the scanning blanking time. Ratios other than these may be used, but switching would then occur during the scanning time of some fields.

If the $n$ or $2n$ ratio is used, other means of storage would be required to "fill in the gap," such as phosphor storage. Also, keying pulses of the proper width would be required.

Still another form of this invention relates to timing such that the "reading" or "picking up" phase may take place in $n$ time, but may be accomplished as follows. If the beam current is reduced on a storage tube during the "picking up" time, the beam does not completely discharge the elements in one scan. To avoid the "gap," or loss of light, therefore, reading may take place in $3n$ time, but consists of three simultaneous scans of the same charge pattern instead of one. Each scan takes place in $n$ time, so that the total "picking up" time is $n+n+n$. In order to accomplish this result, a proper keying voltage may be applied to the control grid of the appropriate storage tube through the ring frequency divider.

Having thus described the invention, what is claimed is:

1. A system for converting color television signals of the sequential type into color television image signals of the simultaneous type comprising a sequential type color television signal channel, a simultaneous type color television signal channel, a plurality of signal storage tubes, switching means to sequentially connect each of said storage tubes to said sequential type color television signal channel, a second switching means to simultaneously connect a plurality of said signal storage tubes to said simultaneous type color television signal channel, and wherein both of said switching means operate to connect different of said signal storage tubes at all times.

2. A system for converting tri-color television systems of the sequential type to tri-color television signals of the simultaneous type comprising a sequential type color television type channel, a simultaneous color television channel, a plurality of signal storage tubes, switching means to sequentially connect each of the storage tubes to said sequential type color television signal channel for a period of time equal to the period of time occupied by a signal component color television representative signal train in the sequential type color television channel, a second switching means to simultaneously connect one-half of said plurality of signal storage tubes to said simultaneous type color television signal channel, and wherein both of said switching means operate to sequentially connect each of said storage tubes to said sequential type signal channel.

3. In a system of color television including scanning means for producing a plurality of independent sequentially arranged series of signals, each representative of one of a plurality of selected component colors of an object whose image is to be reproduced, the combination of two groups of signal storage means, each group having at least one of said storage means for each of said selected component colors, a sequential-type color television signal channel, a simultaneous-type color television signal channel having a plurality of circuits, switching means connected between said sequential-type color television channel and alternately each group of storage means and sequentially within each group, and a second switching means connecting each of the storage means in a group not at that time being connected to said sequential channel to one different of said circuits.

4. A color television transmission system comprising in combination, scanning means for sequentially producing a plurality of independent series of signals, each representative of one of a plurality of selected component colors of an object whose image is to be reproduced, two groups of signal storage means, each of said groups having at least one of said signal storage means designated for each of said selected component colors, switching means connected between said scanning means and said signal storage means, means to actuate said switching means to connect said scanning means to each of said signal storage means sequentially at a rate equal to the sequential rate at which said plurality of independent series of signals are produced, a simultaneous-type color television signal channel having a separate color designated circuit for each of said selected component colors, a second switching means connecting said storage means with said simultaneous channel, and means to connect each of said circuits to a similarly designated color storage means not at that time connected by said other switching means.

5. A system for converting color television signals of the sequential type to corresponding signals of the simultaneous type comprising, a first television signal channel capable of conveying signals of said sequential type, a second television signal channel capable of conveying signals of said simultaneous type, a plurality of signal storage means, means coupling said signal storage means to said first signal channel to individually store a plurality of successive portions of a train of said sequential type television signals sequentially during a time interval of predetermined duration, and means concurrently coupling said signal storage means to said second signal channel to simultaneously reproduce another plurality of successive portions of a train of said sequential type television signals previously stored.

6. A system for converting color television signals of the sequential type to color television signals of the simultaneous type comprising, a plurality of signal storage devices, means controlling the operation of a first group of said devices to individually store a first plurality of said sequential type signals during a first time interval of predetermined duration, means controlling a second group of said storage devices concurrently with said signal-storing operation of said first group of devices for reproducing simultaneously all of a second plurality of said sequential type signals previously individually stored sequentially during a preceding time interval of the same predetermined duration, and means controlling said first group of storage devices for reproducing simultaneously all of said first plurality of stored sequential type signals during a succeeding time interval of the same predetermined duration while said second group of storage devices is operated to store a third plurality of said sequential type signals.

7. A system for converting groups of television image signal trains occurring sequentially during successive time intervals each of the same predetermined duration into television image signal trains occurring simultaneously during said successive time intervals comprising, two groups of signal storage devices, means controlling the operation of a first one of said groups of storage devices to effect a first individual storage of said groups of sequential image signal trains respectively during odd numbered ones of said time intervals, means controlling the operation of a second one of said groups of storage devices to effect a second individual storage of other groups of said sequential image signal trains respectively during even numbered ones of said time intervals, means controlling the operation of said first group of signal storage devices to effect respectively during said even numbered time intervals a simultaneous reproduction of said first sequentially stored groups of image signal trains, and means controlling the operation of said second group of signal storage devices to effect respectively during said odd numbered time intervals a simultaneous reproduction of said second sequentially storage groups of image signal trains.

JOHN PAUL SMITH.

REFERENCES CITED

The following references are of record in the file of this patent:

UNITED STATES PATENTS

| Number | Name | Date |
|---|---|---|
| 2,191,565 | Henroteau | Feb. 27, 1940 |
| 2,253,292 | Goldsmith | Aug. 19, 1941 |
| 2,273,172 | Beers | Feb. 17, 1942 |
| 2,280,191 | Hergenrother | Apr. 21, 1942 |
| 2,335,180 | Goldsmith | Nov. 23, 1943 |
| 2,367,277 | Henroteau | Jan. 16, 1945 |
| 2,381,901 | Goldsmith | Aug. 14, 1945 |
| 2,381,902 | Goldsmith | Aug. 14, 1945 |
| 2,403,562 | Smith | July 9, 1946 |
| 2,408,108 | Teal | Sept. 24, 1946 |
| 2,415,981 | Wolff | Feb. 18, 1947 |
| 2,423,769 | Goldsmith | July 8, 1947 |
| 2,459,131 | Mesner | Jan. 11, 1949 |